UNITED STATES PATENT OFFICE.

HOWARD MATRAVERS ASHLEY, OF FERRYBRIDGE, COUNTY OF YORK, ENGLAND.

MANUFACTURE OF BOTTLES, &c.

SPECIFICATION forming part of Letters Patent No. 403,026, dated May 7, 1889.

Original application filed September 26, 1887, Serial No. 250,767. Divided and this application filed November 10, 1888. Serial No. 290,511. (No specimens.) Patented in England May 25, 1887, No. 7,560; in Austria-Hungary September 19, 1887; in Belgium September 23, 1887; in France September 24, 1887; in Canada January 3, 1888, No. 28,296; in Italy February 17, 1888; in Norway March 2, 1888; in Victoria April 18, 1888; in New South Wales April 20, 1888; in Tasmania April 21, 1888; in Spain July 13, 1888, and in Portugal August 3, 1888.

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in the Manufacture of Internally-Stoppered Bottles, (patented to me in Great Britain and Ireland by Letters Patent No. 7,560, dated May 25, 1887; in Austria-Hungary by Letters Patent dated September 19, 1887; in Belgium by Letters Patent dated September 23, 1887; in France by Letters Patent dated September 24, 1887; in Canada by Letters Patent No. 28,296, dated January 3, 1888; in Italy by Letters Patent dated February 17, 1888; in Victoria by Letters Patent dated April 18, 1888; in New South Wales by Letters Patent dated April 20, 1888; in Tasmania by Letters Patent dated April 21, 1888; in Norway by Letters Patent dated March 2, 1888; in Spain by Letters Patent dated July 13, 1888, and in Portugal by Letters Patent dated August 3, 1888,) of which the following is a specification.

This invention relates to the manufacture of internally-stoppered glass bottles—such, for example, as those known as "Codd's patent"—and is primarily additional to my methods of making bottles and like hollow glassware by machinery set forth in specifications forming part of an application for United States Letters Patent filed September 26, 1887, Serial No. 250,767, of which this is a division, and other divisions thereof filed November 10, 1888, and serially numbered 290,506 and 290,508.

The distinctive objects of the present invention are to introduce internal glass stoppers into bottles after the bottles proper are "finished," but before they cool, and so as to advantageously modify the internal shape of the bottle-neck. In so manufacturing internally-stoppered bottles—such, for example, as those known as "Codd's patent" as aforesaid—the stoppers of which are glass balls, I insert the stopper into the body of the bottle by taking the glass stopper while cool and forcing it into and through the mouth of the finished but hot bottle at the moment when the glass of the bottle is in the transition state between "plastic" and "elastic." The punch or its equivalent used for making the mouth-opening may consequently be of slightly less diameter than the ball or like stopper, and when the cool glass stopper is so forced into and through the contracted mouth it will, by frictional contact with the hot glass, elongate the inner surface of the same. I thus form by the stopper itself a slightly-overhanging shoulder or edge at the upper side of the annular recess which is formed in the neck to receive the customary rubber ring, and thus render it more difficult for the ring, when inserted, to be either forced or shaken out of its seat.

Another advantageous effect of the process is due to the difference between the temperature of the stopper and that of the neck of the bottle at the moment of insertion, for, the stopper being cool and the neck red-hot the neck contracts, but the ball cannot, and therefore the ball has the greater diameter, and is thus prevented from escaping before the rubber ring is inserted.

Having thus described my said process, I claim as my invention and desire to patent under this specification—

1. In the manufacture of internally-stoppered bottles, the within-described process of forcing the cool glass stopper into and through the mouth of the finished bottle while the glass of the latter is in the transition state between plastic and elastic.

2. In the manufacture of internally-stoppered bottles, the within-described process of punching the mouth of slightly less diameter than the stopper and forcing the cool glass stopper into the body of the bottle through the mouth while the glass of the bottle is in the transition state between plastic and elastic, whereby the annular recess for the rubber ring is provided with an overhanging edge, as aforesaid.

HOWARD MATRAVERS ASHLEY.

Witnesses:
FRANCIS FORBES,
JAS. L. EWIN.